United States Patent [19]

Koslov et al.

[11] Patent Number: 4,992,873
[45] Date of Patent: Feb. 12, 1991

[54] VIDEO SIGNAL NOISE REDUCTION APPARATUS USING AMPLITUDE COMPANDING AND PREDICTIVE SIGNAL PROCESSING TECHNIQUES

[75] Inventors: Joshua L. Koslov, East Windsor; Joel W. Zdepski, Lebanon, both of N.J.

[73] Assignee: General Electric, Princeton, N.J.

[21] Appl. No.: 404,023

[22] Filed: Sep. 7, 1989

[30] Foreign Application Priority Data

Nov. 11, 1988 [GB] United Kingdom ............... 8826463

[51] Int. Cl.$^5$ ............................................. H04N 5/20
[52] U.S. Cl. ................................... 358/167; 358/174; 358/135; 358/12
[58] Field of Search ............... 358/167, 140, 160, 133, 358/135, 11, 12, 166, 105, 141, 142, 174, 177

[56] References Cited

U.S. PATENT DOCUMENTS

| 4,636,856 | 1/1987 | Starck | 358/135 |
| 4,851,904 | 7/1989 | Miyazaki et al. | 358/105 |
| 4,875,095 | 10/1989 | Matsumoto et al. | 358/167 |

Primary Examiner—Victor R. Kostak
Attorney, Agent, or Firm—Joseph S. Tripoli; Eric P. Herrmann; Ronald H. Kurdyla

[57] ABSTRACT

A video signal processing system employs an amplitude compander for reducing the effects of transmission noise. The compander includes a transmitter nonlinear amplitude compressor for amplifying small signals and compressing large signals. A receiver includes an amplitude expander with an inverse transfer function. The nonlinear compressor generates out-of-band frequencies which are removed by a transmitter output filter, producing signal distortion. To compensate for such distortion, the transmitter duplicates certain receiver processing circuits, including the receiver amplitude expander and a filter for generating a prediction signal. The prediction signal is subtracted from the transmitter input video signal before the video signal is amplitude compressed at the transmitter, producing an error signal which is transmitted. The error signal is small if the prediction is good, whereby noise reduction results from compressor gain at the transmitter.

18 Claims, 3 Drawing Sheets

VIDEO SIGNAL NOISE REDUCTION APPARATUS USING AMPLITUDE COMPANDING AND PREDICTIVE SIGNAL PROCESSING TECHNIQUES

This invention concerns a video signal noise reduction system employing companding and predictive signal processing.

Transmitting a video signal such as a television signal over a potentially noisy channel typically involves considerations of how to prevent channel noise from degrading the signal-to-noise ratio of the video signal and the quality of a reproduced picture. Companding is one way to improve the quality of a video signal conveyed in a noisy environment. In companding, the amplitude of a video signal is compressed at the transmitter, thereby raising its average-to-peak power ratio and hence its immunity to noise. The signal is amplitude expanded at the receiver with the inverse transfer function of the transmitter compression function, to restore the original video signal amplitude distribution so as to obtain a correct signal for display. When non-linear compression is performed at the transmitter, the signal is modified by means of a combination of small signal expansion and large signal compression. Complementary functions are performed at the receiver.

Nonlinear amplitude compression at the transmitter can produce unwanted out-of-band high frequency signal components, e.g., above 4.2 MHz in the case of a television type video signal. These unwanted high frequency components can be removed by a transmitter output low pass filter. It is herein recognized, however, that such a filter can also introduce unwanted signal distortion which can compromise the quality of the video signal at the receiver after amplitude expansion at the receiver. The disclosed system is directed to compensating for video signal distortion products of the type mentioned, while maintaining good signal-to-noise characteristics. This is accomplished by incorporating in the transmitter a model of a given portion of the receiver, including the receiver portion of the companding function (i.e., the amplitude expander). Thus the transmitter has access to information as to the characteristics of the video signal as processed at the receiver. In the disclosed system, the transmitted signal is a signal representing the difference between the transmitter input signal and a version of an estimate, or prediction, of the signal received at the receiver. This signal is small if the prediction is good, whereby noise immunity is enhanced through companding gain at the transmitter.

Figure 1:
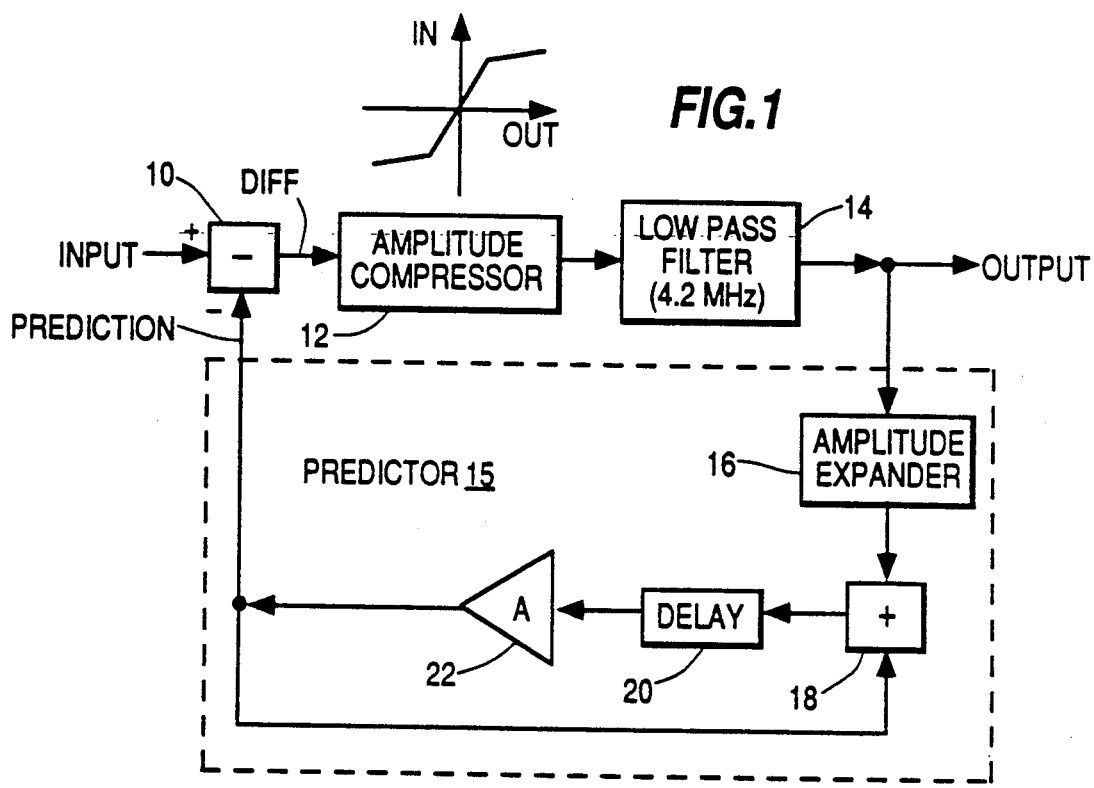
FIG. 1 shows a block diagram of a transmitter encoder portion of apparatus in accordance with the present invention.

In the transmitter arrangement of FIG. 1, an input video signal is applied to one input of a signal subtracter 10, the other input of which receives a signal from a signal predictor network 15 as will be discussed. An output difference signal (DIFF) from subtracter 10 is subjected to nonlinear amplitude compression by means of an amplitude compressor 12 having a nonlinear transfer function as illustrated above block 12. Compressor 12 amplitude compresses large signals greater than a given amplitude threshold and amplitude expands (amplifies) small amplitude signals. Compressor 12 constitutes a component of a companding system together with an amplitude expander, having a complementary transfer function, at a receiver.

The nonlinear transfer characteristic of compressor 12 can generate unwanted high frequency components (e.g. harmonics) which extend above the 4.2 MHz upper limit of the video signal band in this example. These out-of-band high frequency components are filtered by a low pass filter 14 before the OUTPUT signal is transmitted over a channel likely to include signal corrupting noise. Filter 14, however, is likely to introduce unwanted signal distortion of its own. This filter distortion, as well as distortion associated with a mismatch between the compression and expansion functions at the transmitter which may appear in practice, particularly in the case of image motion for example, are reduced or eliminated with the cooperation of predictor network 15.

Figure 2:
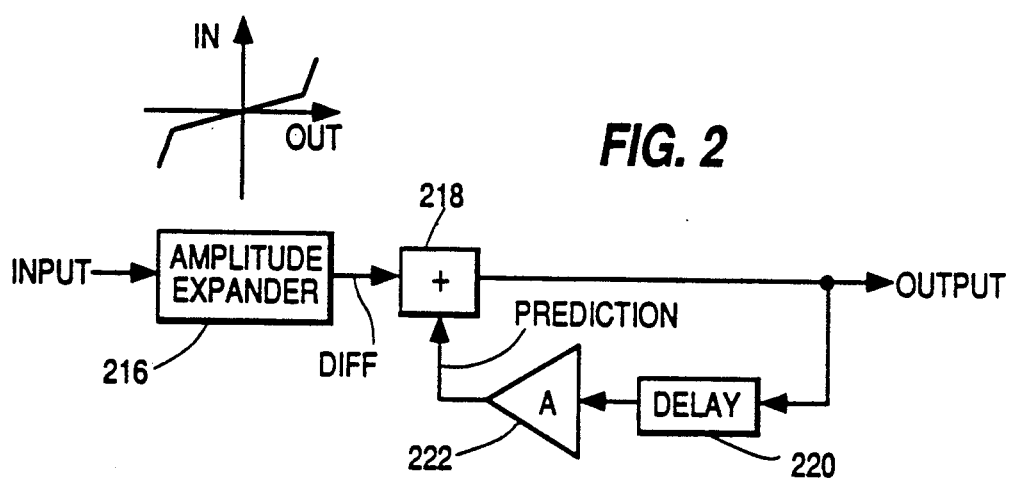
FIG. 2 depicts a block diagram of a receiver decoder portion of apparatus in accordance with the present invention.

Predictor 15 is a replica of an amplitude expander and predictor network found in a receiver which receives a signal transmitted by the apparatus of FIG. 1. Referring to FIG. 2 for the moment, the received input signal, which had been nonlinearly amplitude compressed at the transmitter, is amplitude expanded with the inverse of the transmitter nonlinear transfer function by means of an amplitude expander 216. Expander 216, like Compressor 12 at the transmitter, provides an instantaneous transfer function and may be implemented in the form of a ROM look-up table.

The remaining structure of FIG. 2 is an infinite impulse response (IIR) filter including an adder 218, a pixel storage delay element 220 and an amplifier with a signal gain of "A", all arranged as shown. Delay element 220 for example is a frame delay when processing television-type information since television video information spaced a frame apart is typically highly temporally correlated. Delay 220 and amplifier 222 develop a prediction signal at the output of amplifier 222. In the case of a frame delayed signal from unit 220, the prediction signal at the output of amplifier 222 is simply the same image pixel from the previous frame scaled by amplification factor A, which is less than unity (e.g., 0.75). The prediction process could also involve a function of multiple pixels from multiple fields. In this example scaling factor A is less than unity to prevent noise from propagating around the loop including elements 218, 220 and 222 without decaying. Thus noise in the output signal will decay by a factor of A each time around the loop. The output signal, which is subjected to additional video signal processing in the receiver, is formed by summing the nonlinearly amplitude expanded signal from unit 216 with the prediction signal from amplifier 222.

Returning to FIG. 1, the prediction signal from the output of predictor 15 represents an estimate of the delayed receiver output signal, scaled by factor A. Unit 10 subtracts the prediction signal from the input signal to produce a difference signal which is processed by units 12 and 14 to produce the output signal which is transmitted.

At the transmitter apparatus of FIG. 1, the difference signal is the difference between the input signal and prediction signal. The output of adder 18 is a model of the receiver's output. It can be shown that the signal at the receiver's output is similar to the signal applied to the transmitter input. If the difference signal produced by subtracter 10 at the transmitter is small (indicating a good prediction), nonlinear amplitude compressor 12 will amplify the difference signal and thereby advantageously enhance its signal-to-noise characteristics prior to transmission.

With the disclosed system operating with respect to a 4.2 MHz luminance signal a noise reduction of 2.7 db was observed with a scaling factor A of 0.75 and with a $\mu$-law compandor having a companding parameter ($\mu$) of 11. A noise reduction of 4.1 db was obtained for A of 0.90 and $\mu$ of 40.

Figure 3:
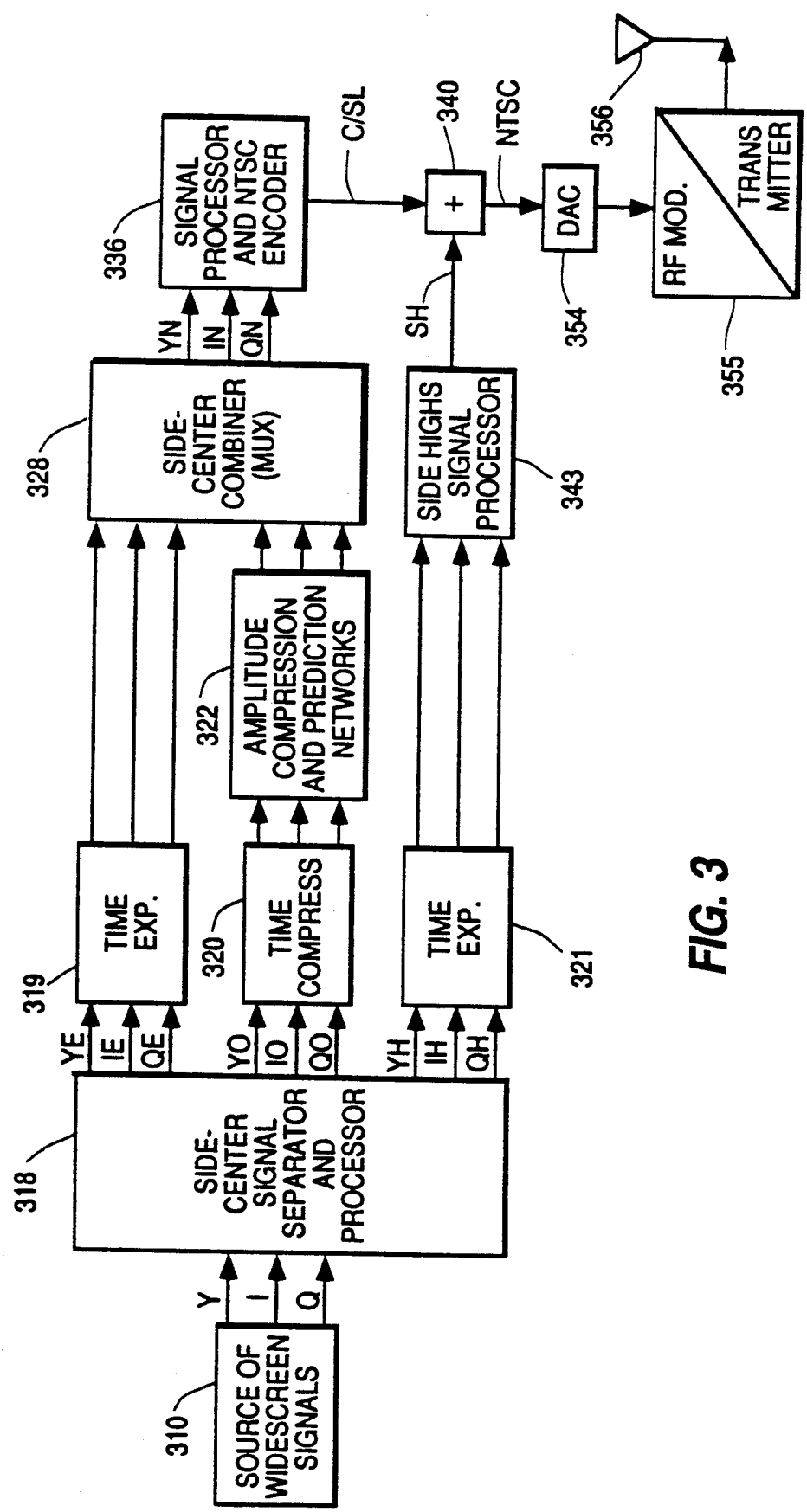
FIG. 3 is a block diagram of a transmitter portion of a widescreen television signal processing system including apparatus according to the invention.

FIG. 3 shows a block diagram of an encoder for a compatible widescreen television system, e.g. for processing a 5:3 wide aspect ratio signal, including compression and prediction networks of the type depicted by FIG. 1. With the exception of such networks, the system of FIG. 3 is disclosed in greater detail in Strolle et al. U.S. Pat. 4,816,899.

In FIG. 3 a source of widescreen television signals 310 provides widescreen television color video components Y (luminance) and I, Q (color difference) in digital form. Source 310 also illustratively includes matrix, analog-to-digital converter and low pass filtering circuits. The signals from source 310 are processed by a side-center panel signal separator and processor 318 to produce three groups of output signals YE, IE and QE; YO, IO and QO; and YH, IH and QH. The first two groups of signals (YE, IE, QE and YO, IO, QO) are processed to respectively develop a signal containing a center panel component, and side panel low frequency luminance information (luminance lows) time compressed into horizontal image overscan regions. The third group of signals (YH, IH, QH) is processed to develop a signal containing side panel high frequency information (side panel highs). When the center and side panel signal components are eventually combined, an NTSC compatible widescreen signal with a 4:3 display aspect ratio is produced. Signals YO, IO and QO provide the low frequency side panel information, exclusive of side panel high frequency information, which is inserted into the left and right horizontal overscan regions. Signals YO, IO and QO are individually processed by amplitude compression and prediction networks (of the type shown in FIG. 1) within block 322 before being combined with signals YE, IE and QE by a side-center signal combiner 328, eg. a time multiplexer. Combiner 328 produces signals YN, IN and QN with a standard 4:3 image aspect ratio.

A signal processor and NTSC encoder 336 processes signals YN, IN and QN to develop an NTSC compatible composite output signal C/SL comprising center panel information, and side panel low frequency information compressed into horizontal overscan regions. Unit 336 includes luminance and chrominance filters, a chrominance modulator, and conventional NTSC encoding circuits for encoding luminance and chrominance information.

Side panel high frequency components YH, IH and QH are additionally processed by a unit 343 after being time expanded by unit 321. In unit 343 the side panel highs modulate an auxiliary suppressed subcarrier with a phase that reverses at the field rate. The modulated subcarrier is subjected to amplitude compression and bandpass filtering to develop a side panel highs signal SH. This signal is combined with signal C/SL in a combiner 340 to produce a widescreen compatible signal NTSC. Signal NTSC is converted to analog form by a digital-to-analog converter (DAC) 354 before being applied to an RF modulator and transmitter network 355 for broadcast via an antenna 356.

Amplitude compression and prediction network 322 can be similarly situated in an enhanced image definition version of the illustrated widescreen encoder system disclosed in the Strolle et al. patent. Such an enhanced definition system is disclosed in a copending J. S. Fuhrer U.S. patent application Ser. No. 139,339 titled "Compatible Television System with Companding of Auxiliary Signal Encoding Information."

Figure 4:
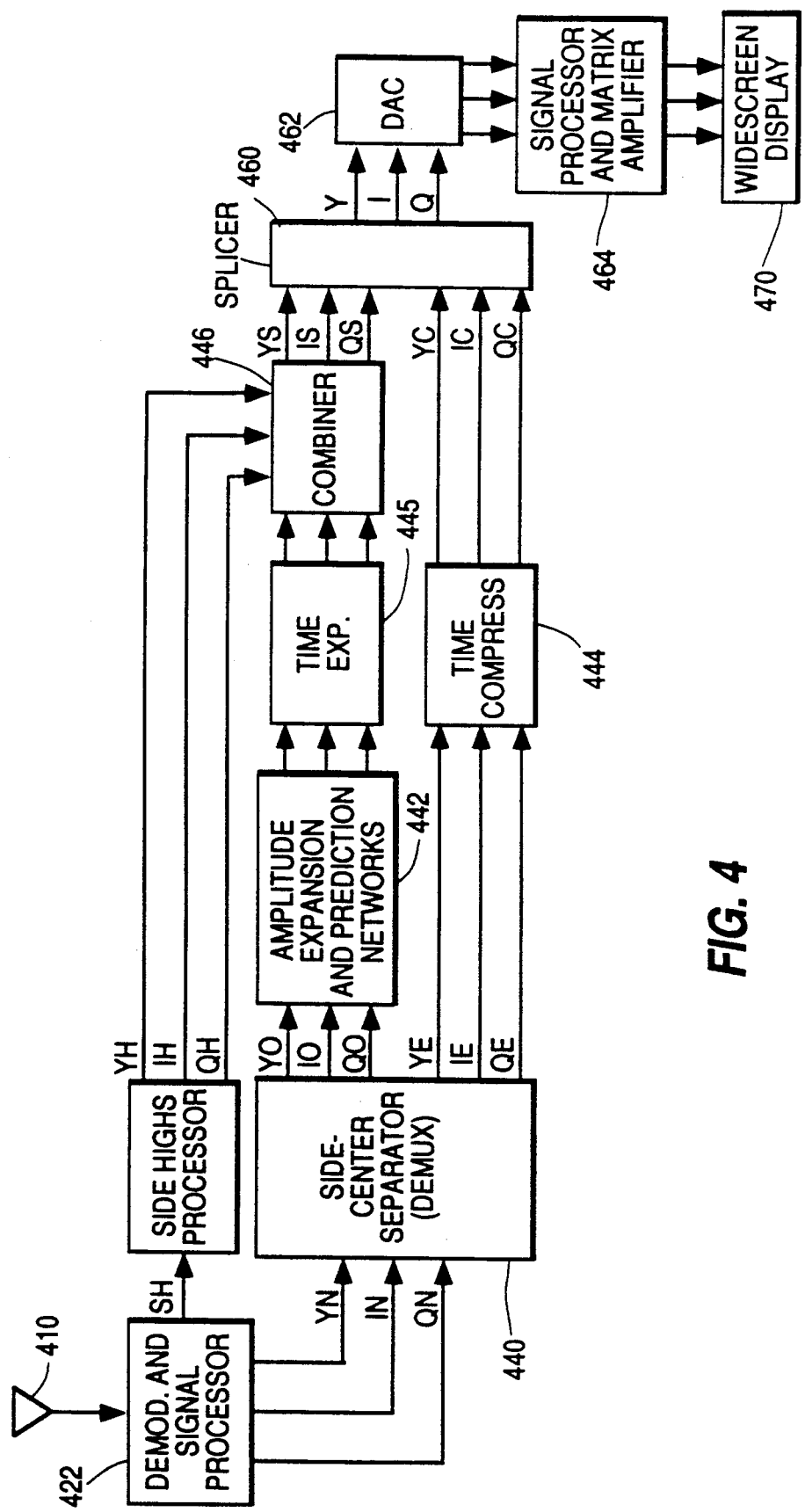
FIG. 4 is a block diagram of a portion of a widescreen television receiver employing apparatus according to the present invention.

FIG. 4 depicts a block diagram of a widescreen receiver decoder for the compatible widescreen television signal developed by the transmitter encoder of FIG. 3. With the exception of expansion and prediction network 422, the system of FIG. 4 is disclosed in greater detail in the aforementioned Strolle et al. patent.

The transmitted compatible widescreen signal is received by an antenna 410 and demodulated by an input demodulating and signal processing unit 422 to develop signals YN, IN, QN and side panel highs signal SH. Unit 422 includes filtering and amplitude expanding networks for recovering signal SH, and signal combining, filtering and chrominance demodulation networks for recovering signals YN, IN and QN. A processor 454 responds to side highs signal SH for producing signals YH, IH, and QH. In processor 454 the auxiliary subcarrier is demodulated, luminance and chrominance side panel highs components are separated, and the luminance side panel highs are time compressed to produce side panel highs signal components YH, IH and QH.

Signals YN, IN and QN are separated into low frequency side panel components YO, IO, QO and center panel components YE, IE, QE by means of a side-center separator (de-multiplexer) 440. Signals YE, IE, QE are time compressed by a unit 444 to occupy the prescribed center panel display region. Signals YO, IO, QO are individually subjected to amplitude expansion and predictive signal processing in network 442 before being time expanded by a unit 445 to occupy the prescribed side panel display region. Network 442 contains circuits of the type shown in FIG. 2 for respectively processing signals YO, IO and QO.

Side panel lows signals from time expander 445 and side panel highs signals from processor 454 are combined in a unit 446 to produce side panel luminance and chrominance signals YS, IS and QS. Reconstructed side panel signals YS, IS, QS are spliced to reconstructed center panel signals YC, IC, QC from time compressor 444 by means of a splicer 460 to form a fully reconstructed widescreen signal containing components Y, I and Q.

Widescreen signals Y, I, Q are converted to analog form by means of a digital-to-analog converter (DAC) 462 before being applied to a video signal processor and matrix amplifier 464. The video signal processor component of unit 464 includes signal amplifying, DC level shifting, peaking, brightness control, contrast control and other video signal processing circuits of a conventional nature. Matrix amplifier 464 combines luminance signal Y with color difference signals I and Q to produce color image representative video signals R, G and B. These color signals are amplified by display driver amplifiers in unit 464 to a level suitable for directly driving a widescreen color image display device 470, eg., a widescreen kinescope.

As noted above, the encoder arrangement of FIG. 3 encodes low frequency side panel information in time compressed form. Illustratively, luminance information from DC to 700 KHz is time compressed approximately 6:1 so that the side panel low frequency information occupies a 4.2 MHz bandwidth. The receiver (FIG. 4) performs a corresponding time expansion as mentioned. The process of nonlinear amplitude compression at the transmitter is particularly likely to generate unwanted out-of-band frequencies when, as in this example, the time compression process produces a signal exhibiting frequencies at or near the upper limit of the desired frequency band (eg., 4.2 MHz).

Because of time compression and expansion, the side panel low frequency component contains much more noise energy under noisy channel conditions than the same frequency band of center panel information. This condition manifests itself as an objectionable difference in the noise between displayed center panel and side panel images. Specifically, side panel images exhibit horizontally "streaky" low frequency noise which contrasts with the broader bandwidth noise in the center panel image and is more objectionable. Side panel information therefore appears visibly different from center panel information, particularly for transmission channels with signal-to-noise ratios below about 35 db. Thus the apparatus of FIGS. 1 and 2 are advantageously used to enhance the signal-to-noise characteristic of the time compressed side panel low frequency information. The disclosed apparatus alternatively can be employed in the transmitter system of FIG. 3 between unit 318 and time compressor 320, in which case the output signal path of the FIG. 1 apparatus would be low pass filtered to 700 KHz for luminance lows compressed 6:1.

The disclosed signal companding and prediction apparatus also can be used for processing time expanded side panel high frequency signals YH, IH and QH from unit 321 in FIG. 3. In this regard it is noted that, with the FIG. 3 system as illustrated, the side panel high frequency information obtains a signal-to-noise improvement due to time expansion by expander 321. However, this improvement is compromised by the amplitude attenuation unit 343 imparts to the side highs modulated auxiliary subcarrier to make the modulated auxiliary subcarrier less visible when the widescreen television signal is received by a standard television receiver having a standard 4:3 aspect ratio. The disclosed noise reduction apparatus can be used to enhance the noise immunity of the side highs information, depending on the requirements of a particular system.

What is claimed is:

1. A video signal processing system for reducing the effect of noise on transmitted video signals, comprising:
    amplitude compressor means for compressing the amplitude of video signals in accordance with a given transfer function;
    predictive means responsive to an output signal from said compressor means for producing a predictive signal as a function of the magnitude of a previous video signal sample, said predictive means including amplitude expander means having a transfer function substantially the inverse of said given transfer function; and
    means for providing a difference signal, indicating difference in magnitude between an input video signal and said predictive signal, to an input of said amplitude compressor.

2. A system according to claim 1, wherein
    said amplitude compressor exhibits a nonlinear transfer function wherein small amplitude signals are expanded and large amplitude signals are compressed.

3. A system according to claim 2, and further comprising
    means for filtering output signals from said amplitude compressor; and wherein
    said predictive means responds to an output signal from said amplitude compressor after filtering by said filtering means.

4. A system according to claim 3, wherein
    said filtering means is a low pass filter.

5. A system according to claim 1, wherein said predictive means comprises:
    an input node corresponding to an input of said amplitude expander, and an output node coupled to said difference signal providing means;
    combining means having a first input for receiving a signal from said amplitude compressor means, a second input, and an output; and
    translating means for providing an attenuated time delayed version of signals from said output of said combining means to said output node and to said second input of said combining means.

6. A system according to claim 5, wherein
    said translating means includes means for delaying signals for an interval over which video signal information is substantially correlated.

7. A system according to claim 5, wherein
    said delaying means exhibits an image frame delay interval.

8. Apparatus for receiving signals transmitted by the system of claim 1, comprising:
    receiver amplitude expander means for receiving said transmitted signals, said expander means having a transfer function substantially the inverse of said given transfer function;
    combining means having a first input for receiving output signals from said receiver amplitude expander means, a second input, and an output,
    predictive means responsive to signals from said output of said combining means for producing a predictive signal as a function of the magnitude of a previous video signal sample; and
    means for coupling said predictive signal to said second input of said combining means.

9. Apparatus according to claim 8, wherein said predictive means includes:
    signal attenuating means; and
    means for delaying signals for an interval over which video signal information is substantially correlated.

10. In a system for processing a widescreen television-type signal containing a main panel image component and a side panel image component and having an image aspect ratio greater than that of a standard television image, said system including means for time compressing prescribed side panel information, apparatus for reducing the effect of noise on transmitted video signals, comprising:
    amplitude compressor means for compressing the amplitude of said side panel component in accordance with a given transfer function;
    predictive means responsive to an output signal from said compressor means for producing a predictive signal as a function of the magnitude of a previous side panel component sample, said predictive means including amplitude expander means having a transfer function substantially the inverse of said given transfer function; and means for providing a difference signal, indicative of a difference in magnitude between an input side panel component and said predictive signal, to an input of said amplitude compressor.

11. A system according to claim 10, wherein said amplitude compressor exhibits a nonlinear transfer function wherein small amplitude signals are expanded and large amplitude signals are compressed.

12. A system according to claim 11, and further comprising means for filtering output signals from said compressor; and wherein said predictive means responds to an output signal from said amplitude compressor after filtering by said filtering means.

13. A system according to claim 12 wherein said filtering means is a low pass filter.

14. A system according to claim 10, wherein said predictive means comprises:

an input node corresponding to an input of said amplitude expander, and an output node coupled to said difference signal providing means;

combining means having a first input for receiving a signal from said amplitude compressor means, a second input, and an output; and translating means for providing an attenuated time delayed version of signals from said output of said combining means to said output node and to said second input of said combining means.

15. A system according to claim 14, wherein said translating means includes means for delaying signals for an interval over which video signal information is substantially correlated.

16. A system according to claim 14, wherein said delaying means exhibits an image frame delay interval.

17. Apparatus for receiving widescreen signals transmitted by the system of claim 10, comprising:

receiver amplitude expander means for receiving said transmitted signals, having a transfer function substantially the inverse of said given transfer function;

combining means having a first input for receiving output signals from said receiver amplitude expander means, a second input, and an output;

predictive means responsive to signals from said output of said combining means for producing a predictive signal as a function of the magnitude of a previous video signal sample;

means for coupling said predictive signal to said second input of said combining means; and means for time expanding signals from said output of said combining means.

18. In a system for receiving a widescreen television-type signal containing a main panel image component and a side panel image component and having an image aspect ratio greater than that of a standard television image, side panel image component processing apparatus comprising:

amplitude expander means having a nonlinear transfer characteristic responsive to said side panel image component;

combining means having a first input for receiving output signals from said receiver amplitude expander means, a second input, and an output;

predictive means responsive to signals from said output of said combining means for producing a predictive signal as a function of the magnitude of a previous video signal sample;

means for coupling said predictive signal to said second input of said combining means; and means for time expanding signals from said output of said combining means.

* * * * *